April 11, 1950  D. W. SEIFERT  2,503,514
RADIATOR DEFREEZER
Filed Aug. 16, 1946
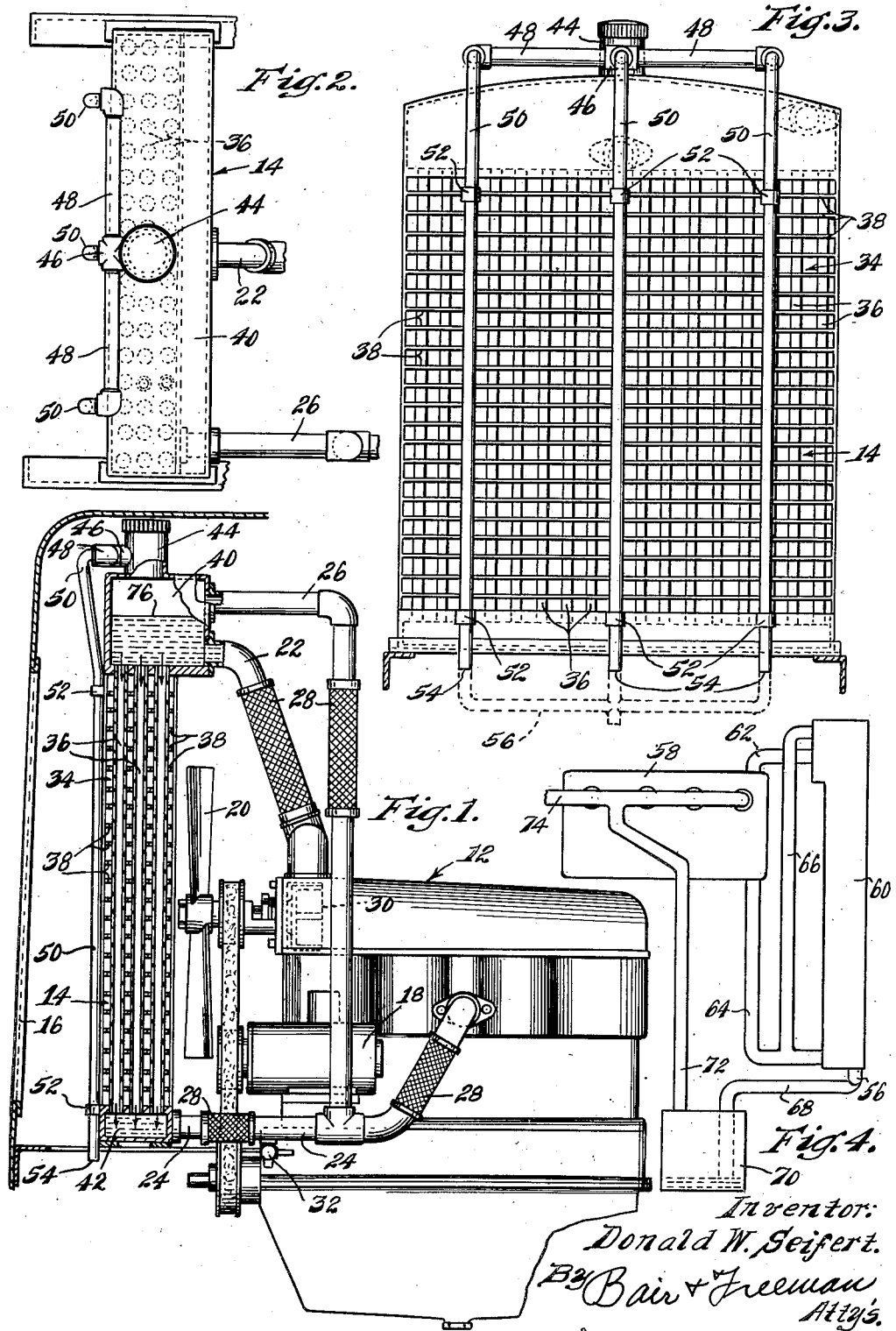
Inventor:
Donald W. Seifert.
By Bair & Freeman
Attys.

Patented Apr. 11, 1950

2,503,514

UNITED STATES PATENT OFFICE 2,503,514

RADIATOR DEFREEZER

Donald William Seifert, Winona, Minn.

Application August 16, 1946, Serial No. 690,943

10 Claims. (Cl. 123—174)

This invention relates to means for defreezing automobile radiators.

As is well known, when an automobile radiator freezes and the engine is operating, the water or coolant liquid in the engine boils, which causes steam to form and pass up and collect in the upper part of the radiator. This action will not clear the ice from the radiator core, and the steam is forced out the overflow pipe. My invention is designed to conduct this steam in contact with the core of the radiator and utilize it for thawing the ice therein.

The customary overflow conduit in the radiator is designed for bringing the steam into contact with the radiator core, while utilizing the conduit for ordinary overflow functions. To accomplish this results more effectively, the conduit is made up of a plurality of passages for increasing the rate of defreezing.

When the engine continues to operate with the radiator frozen, not only does steam generate and escape, but also the coolant in liquid form is forced out the overflow pipe. Operation of the engine forces the liquid out of the engine and into the top part of the radiator where it is forced out, resulting in much waste of the coolant. This loss is reduced greatly by the novel circulating arrangement of my invention. An auxiliary conduit inter-connects the customary conduits which communicate between the engine and radiator, by-passing the radiator. By means of this arrangement, the coolant instead of being forced out through the overflow pipe as just described, returns through the by-pass conduit and circulates through the engine again.

To render the above mentioned by-pass conduit effective only when the radiator is frozen, I provide for its connection with the radiator at a point therein above the normal level of liquid in the radiator. The circulating conduit interconnecting the upper portions of the engine and radiator enters the radiator at a point below the normal level of liquid in the radiator. In normal operation with the radiator functioning properly, the coolant liquid circulates through the radiator in the customary manner, and does not rise to the point where the by-pass conduit enters the radiator; but when the radiator is frozen, the level of the liquid in the radiator rises, as explained above, and returns through the by-pass conduit.

Another advantage of the invention is that means is provided for preventing leakage of the radiator.

With these and other advantages of the invention in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a combination view showing the device of my invention with an automobile engine in elevation and the radiator in section;

Figure 2 is a plan view of an automobile radiator with the defreezer of my invention applied thereto;

Figure 3 is a front view of the radiator shown in Figure 2, and

Figure 4 is a diagrammatic view of a modified form of the invention.

Referring in detail to the drawings, an automobile engine is shown at 12 and a radiator at 14, which is provided with a grille 16. The engine is equipped with the customary appliances, a generator 18 and a cooling fan 20, both of which are driven by a belt which in turn, is driven by the crankshaft of the engine in the ordinary manner.

Communicating between the top of the engine and the interior of the upper part of the radiator is a conduit 22, and a return conduit 24 communicates between the bottom of the radiator and the engine block at a point below the top thereof, for the circulation of water or liquid coolant. A by-pass conduit 26 communicates with the interior of the radiator at a point above the conduit 22, and leads downward to the return conduit 24 and communicates therewith at a convenient point between the radiator and engine. All of the conduits 22, 24 and 26 are provided with hose connections 28 to compensate for vibration between the engine and radiator.

A water pump impeller is shown at 30 and is mounted on the fan-shaft for circulating the water in the cooling system. A radiator drain cock 32 is provided in the return conduit 24 at the lowermost point of the circulation system.

The radiator proper consists of core 34 having vertically disposed tubes 36 and heat dissipating fins 38. The radiator is provided at the top with a container or tank 40, and at the bottom with a lower tank 42, between which the tubes 36 communicate in the usual manner in an automobile cooling system. The upper tank 40 is larger than usual in the case of automobile radiators for the purpose to be explained herein.

Tank 40 is supplied with an air-tight filling inlet 44 and connected to and leading from the inlet 44 is an overflow pipe 46. The point of connection between the overflow pipe 46 and the inlet 44 is at a point higher than the point of communication of conduit 26 with the tank 40. The overflow pipe 46 is formed with a header 48 disposed transversely of the radiator and three individual pipes 50 leading therefrom downwardly along the front surface of the radiator core. The pipes 50 are secured to the core by means of convenient clamps 52, or solder, for providing a wider area of contact. The lower ends of the pipes 50 extend beyond the lower edge of the radiator core and open to atmosphere at 54, or a header at 56. It will be noted that the pipes 50 are in close engagement with the radiator core to provide for defreezing action. The overflow pipe 46 serves the purpose of the usual overflow pipe with which all automobiles are provided.

The pipes 50 are shown connected together at the bottom by a header 56 shown in dotted lines in Fig. 3. This header is for use in the modification shown in Fig. 4.

Fig. 4 shows a conventional automobile engine 58 and radiator 60. This arrangement includes, similarly to Fig. 1, a conduit 62 interconnecting the upper part of the engine, and the top of the radiator, and a return conduit 64 interconnecting the lower part of the radiator and the lower part of the engine. Also included is an auxiliary conduit 66 connecting the top of the radiator with the return conduit 64.

Leading from the header 56, which is shown in full lines in Fig. 4 and which is connected with the pipes 50, is a conduit 68 which opens into a sealed trap 70. Steam or condensed coolant flowing through the overflow pipe 46 passes through the pipes 50, as described in connection with Figures 1 to 3, and then through header 56 and conduit 68. Leading from the trap 70 is an additional conduit 72 leading to the intake manifold 74 in the engine.

*Operation*

In normal operation, the device of the present invention operates as any cooling system for an automobile. The radiator and cooling system is filled with water or other liquid coolant, to a point indicated in the drawing at 76, which is the normal liquid level. It will be noted that this level is at a point between the places where the conduits 22 and 26 communicate with the tank 40. On operation of the pump 30, the water or other liquid coolant is driven upwardly through the conduit 22 into the tank 40 at the upper part of the radiator. As the liquid from the engine block enters the tank 40, it descends through the tubes 36 and is cooled in the usual manner, and returns through return conduit 24 to the engine block.

If the radiator should become frozen and the engine is operated, the water in the engine, is of course, heated and driven to the tank 40, where steam collects and is forced out through the overflow pipe 46. Since the pipes 50 from the overflow conduit are in contact with the radiator core, the steam on passing therethrough thaws the ice in the radiator at points along these pipes 50. With passages through the ice thus opened up, the heated liquid coolant is enabled to pass therethrough. The heated coolant then tends to be conducted throughout the radiator, enlarging the openings. When the passages become too large, the movement of the coolant becomes slower and it carries less heat. The passages thereby become smaller until a point of equilibrium is reached where the proper amount of coolant is circulated to cool the engine and keep passages open through the radiator.

A disadvantage that has always occurred in connection with frozen radiators is that the heated water from the engine, on being forced into the tank 40, is also forced out through the overflow pipe 46. This results in a waste of the coolant and is an objectionable feature. In my invention, the provision of the by-pass conduit 26 prevents such wastage of the liquid coolant. As the level of the liquid 76 rises in the tank 40, instead of being forced out of the overflow pipe 46, passes into the by-pass conduit 26 and into the return conduit 24, completing circulation through the engine. This by-passing of the liquid through the by-pass conduit 26 does not prevent steam from being forced out the overflow conduit, and accordingly does not retard the thawing effect of the radiator. However, it does prevent undue waste of the liquid coolant. When the radiator is thawed, the liquid coolant passes therethrough and the level of the liquid in the circulation system returns to its normal level at a point between the conduits 22 and 26.

From the foregoing, it will be seen that the radiator operates as a normal radiator when it is not frozen, but with the device of my invention applied thereto, normal operation of the engine effects thawing of the radiator, and, in addition, the auxiliary circulation circuit comes into play and operates to prevent wastage of the liquid coolant until the radiator again operates in the normal fashion.

The operation of the device as shown in Fig. 4 is the same as the previous embodiment, with respect to the thawing process of the radiator. However, instead of losing the overflow coolant, it is discharged into the trap 70. The reduced pressure in the intake manifold of the engine causes a partial vacuum in the trap 70, which is passed into the radiator, resulting in a reduced pressure in the radiator. If the radiator should spring a leak, the reduced pressure in the radiator will result in outside atmosphere entering the radiator and preventing leakage of the coolant through the leak.

The illustration herein shows the invention as applied to an automobile, but it will be understood that it is applicable to any installation of liquid cooled engine, whether in an automobile, airplane, or other installation, and the claims herein are intended to be so interpreted.

While I have herein shown and described certain preferred embodiments of my invention, manifestly they are capable of modification and rearrangement of parts without departing from the spirit and scope thereof. I do not, therefore, wish to be understood as limiting this invention to the precise forms herein disclosed, except as I may be so limited by the appended claims.

I claim as my invention:

1. A defreezer for a radiator in a liquid cooling system for an engine, said system having a conduit connecting the upper portions of the engine and radiator, and a return conduit connecting the lower portions of the radiator and engine, comprising, means for receiving steam collected in the upper part of the radiator and conducting it therefrom in contact with the front of the radiator core, and a by-pass conduit connecting the upper and lower conduits for by-passing the radiator.

2. A defreezer for a radiator in a liquid cooling system for an engine, said system having a conduit connecting the upper portions of the engine and radiator, and a return conduit connecting the lower portions of the radiator and engine, comprising, a conduit for receiving steam collected in the upper part of the radiator and conducting it therefrom in contact with the front of the radiator core, said conduit having a plurality of passages in contact with the radiator core, and a by-pass conduit connecting the upper and lower conduits for by-passing the radiator.

3. A defreezer for a radiator in a liquid cooling system for an engine, said system having a conduit connecting the upper portions of the engine and radiator, and a return conduit connecting the lower portions of the radiator and engine, comprising, a conduit for receiving steam collected in the upper part of the radiator and conducting it therefrom in contact with the radiator core, said conduit having a plurality of passages in contact with the radiator core, said passages comprising individual conduits and discharging to atmosphere, and a by-pass conduit connecting the upper and lower conduits for by-passing the radiator.

4. A defreezer for a radiator in a liquid cooling system for an engine, said system having a conduit connecting the upper portions of the engine and radiator, and a return conduit connecting the lower portions of the radiator and engine, comprising, an overflow conduit for receiving steam collected in the upper part of the radiator and conducting it therefrom in contact with the front of the radiator core, said overflow conduit having a plurality of passages in contact with the front of the radiator core, said overflow conduit communicating with the upper part of the radiator at a point above the normal liquid level in the radiator, and a by-pass conduit connecting the upper and lower conduits which interconnect the engine and radiator for by-passing the radiator.

5. A defreezer for a radiator in a liquid cooling system for an engine, said system having a conduit connecting the upper portions of the engine and radiator, and a return conduit connecting the lower portions of the radiator and engine, comprising, means for receiving steam collected in the upper part of the radiator and conducting it therefrom in contact with the radiator core, and a by-pass conduit connecting the upper and lower conduits for by-passing the radiator, said by-pass conduit communicating with said upper conduit within the interior of the upper part of the radiator.

6. A defreezer for a radiator in a liquid cooling system for an engine, said system, comprising a conduit connecting the upper portion of the engine with the upper portion of the radiator at a point below the normal liquid level in the radiator, a return conduit connecting the lower portion of the radiator with the lower portion of the engine, an overflow conduit for receiving steam collected in the upper part of the radiator and conducting it therefrom in contact with the front of the radiator core, and a by-pass conduit connecting the upper and lower conduits for by-passing the radiator, said by-pass conduit communicating with the interior of the radiator at the upper part thereof at a point above the normal liquid level in the radiator and below the overflow conduit outlet.

7. A defreezer for a radiator in a liquid cooling system for an engine, the cooling system having a circuit for circulating liquid through the engine and through the radiator, comprising, conduit means communicating with the interior of the radiator and in thermal conductive contact with the exterior of the radiator for thawing ice in radiator by heat from the cooling system, and separate means for by-passing the coolant liquid around the radiator when the radiator is frozen and having constant communication with the engine.

8. A defreezer for a radiator in a liquid cooling system for an engine, said system having an upper conduit connecting the upper portions of the engine and radiator, and a return conduit connecting the lower portions of the radiator and engine, comprising, an overflow conduit for receiving steam collected in the upper part of the radiator and conducting it therefrom in contact with the radiator core, a sealed trap, the outlet of said overflow conduit communicating with said sealed trap, a conduit communicating between said sealed trap and the intake manifold of the engine, and a by-pass conduit connecting the upper and return conduits for by-passing the radiator when frozen.

9. A defreezer for a radiator in a liquid cooling system for an engine, said system having an upper conduit connecting the upper portions of the engine and radiator, and a return conduit connecting the lower portions of the radiator and engine, comprising, an overflow conduit for receiving steam collected in the upper part of the radiator and conducting it therefrom in contact with the front of the radiator core, a sealed trap, said overflow conduit communicating with the upper part of the radiator at a point above the high liquid level in the radiator and discharging into said sealed trap, a conduit communicating between said sealed trap and the intake manifold of the engine, and a by-pass conduit connecting the upper and return conduits for by-passing the radiator when frozen.

10. A defreezer for a radiator in a liquid cooling system for an engine, said system having an upper conduit connecting the upper portions of the automobile engine and radiator, and a return conduit connecting the lower portions of the radiator and engine, comprising, an overflow conduit, a sealed trap, said overflow conduit communicating with the upper part of the radiator at a point above the high liquid level in the radiator and discharging into said sealed trap, said overflow conduit being in thermal conductive contact with the radiator, and a conduit communicating between said sealed trap and the intake manifold of the engine.

DONALD WILLIAM SEIFERT.

REFERENCES CITED

The following references are of record in the file of this patent:

UNITED STATES PATENTS

| Number | Name | Date |
|---|---|---|
| 1,298,784 | Randall | Apr. 1, 1919 |
| 1,337,576 | Weeks | Apr. 20, 1920 |
| 1,360,178 | Cobe | Nov. 23, 1920 |
| 1,431,044 | Renouf | Oct. 3, 1922 |
| 1,557,496 | Innes | Oct. 13, 1925 |
| 2,023,920 | Eisinger et al. | Dec. 10, 1935 |
| 2,175,121 | Katz et al. | Oct. 3, 1939 |